United States Patent
Giefer et al.

(10) Patent No.: US 8,336,418 B2
(45) Date of Patent: Dec. 25, 2012

(54) ACTUATING DEVICE WITH SELECTOR LEVER RETURN

(75) Inventors: Andreas Giefer, Lemforde (DE); Jorg Meyer, Wagenfeld (DE); Ludger Rake, Diepholz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 713 days.

(21) Appl. No.: 12/531,319

(22) PCT Filed: Mar. 5, 2008

(86) PCT No.: PCT/DE2008/000381
§ 371 (c)(1),
(2), (4) Date: Sep. 15, 2009

(87) PCT Pub. No.: WO2008/116437
PCT Pub. Date: Oct. 2, 2008

(65) Prior Publication Data
US 2010/0024584 A1    Feb. 4, 2010

(30) Foreign Application Priority Data
Mar. 27, 2007  (DE) .......................... 10 2007 015 262

(51) Int. Cl.
*B60K 20/00* (2006.01)
(52) U.S. Cl. ................ 74/473.23; 74/473.27; 74/473.28
(58) Field of Classification Search ............... 74/473.18, 74/473.21–473.28, 473.33
See application file for complete search history.

(56) References Cited

U.S. PATENT DOCUMENTS

| | | | | |
|---|---|---|---|---|
| 3,172,301 A | * | 3/1965 | Hurst, Jr. et al. | ........... 74/473.33 |
| 5,056,376 A | * | 10/1991 | Moroto et al. | .................. 74/335 |
| 5,494,141 A | * | 2/1996 | Osborn et al. | ............. 192/220.4 |
| 7,204,785 B2 | | 4/2007 | Berger et al. | |

FOREIGN PATENT DOCUMENTS

| | | |
|---|---|---|
| DE | 37 22 206 A1 | 1/1989 |
| DE | 103 20 280 A1 | 11/2003 |
| DE | 10 2005 021 678 A1 | 7/2006 |
| DE | 10 2005 005 669 A1 | 8/2006 |
| FR | 536 183 | 4/1922 |
| WO | 2006/084544 A2 | 8/2006 |

* cited by examiner

*Primary Examiner* — Troy Chambers
*Assistant Examiner* — Terence Boes
(74) *Attorney, Agent, or Firm* — Davis & Bujold, PLLC (57) ABSTRACT

An actuating device for selecting shift positions of a shift-by-wire gearshift transmission. The actuating device comprises a selector lever that is movable between stable lever positions from at least one drive mode position to a parking lock position, a detent device with a spring-loaded detent element, a detent guide-plate and a separating device with an actuator-operated thrust wedge. The detent element and the detent guide-plate can be moved by the thrust wedge from a first position, in which the detent element engages in a shift track of the detent guide-plate, to another second position in which the detent element is disengaged from the shift track of the guide-plate. The actuating device enables automatic return of the selector lever to the parking lock position and thus provides the driver with correct visual and tactile feedback about the actual shift status of the transmission.

10 Claims, 5 Drawing Sheets

ACTUATING DEVICE WITH SELECTOR LEVER RETURN

This application is a National Stage completion of PCT/DE2008/000381 filed Mar. 5, 2008, which claims priority from German patent application serial no. 10 2007 015 262.2 filed Mar. 27, 2007.

FILED OF THE INVENTION

The invention concerns an actuating device for a gearshift transmission, in particular an automatic transmission with shift-by-wire actuation.

BACKGROUND OF THE INVENTION

Gearshift transmissions of motor vehicles are usually controlled or shifted by means of an actuating device arranged within reach of the driver. As a rule actuating elements such as a gearshift lever or selector lever are used for this, which are arranged for example between the front seats of the motor vehicle.

The design and ergonomic requirements for such actuating devices or selector levers for gearshift transmissions are many and various. For example, to enable the driver for reasons of safety and ergonomics to have a realistic feeling of transmission actuation, actuating devices of this type are required to provide the driver with both visual and clear haptic or tactile feedback. From this the driver should be able to conclude, when operating the selector lever, which shift process has actually taken place in the transmission. Likewise, it should be possible for the driver to grasp intuitively the shift condition of the transmission at the time, with a glance or by touching the selector lever.

It is therefore desirable to communicate to the driver clear visual and tactile feedback about the current transmission condition or the actual gear engaged, with reference to the position or angular setting of the selector lever at the time.

In the case of mechanical transmission actuation or a mechanical link between the selector lever and the gearshift transmission—for example by means of a cable pull or link-rods—the selector lever position always corresponds to the actual transmission setting because of the mechanical coupling. Since mechanically actuated gearshift transmissions are generally multi-stable (the transmission shift setting is stable in several or all positions, so it does not change spontaneously), the associated selector lever is also multi-stable and therefore, like the gearshift transmission itself, remains in the respective position or gear engaged by the driver.

Consequently the driver can on the one hand conclude from the selector lever position at the time what the current shift condition of the transmission is, or, with reference to the selector lever position, he can recognize the gear engaged in the transmission, and can on the other hand rely on the fact that the selector lever position is not misrepresenting the shift condition of the transmission.

However, in the case of the increasingly used electric actuation or so-termed shift-by-wire actuation of gearshift transmissions, there is no longer any mechanical link between the actuating element or selector lever in the passenger compartment and the transmission of the motor vehicle in the engine compartment. Rather, in the case of transmissions controlled by the "shift-by-wire" method, shift commands are transmitted from the actuating device to the transmission of the motor vehicle mostly exclusively by means of electric or electronic signals and are implemented by subsequent, mostly electro-hydraulic conversion of the shift commands.

This applies in part as well to modern change-speed or gearshift transmissions, but in particular to the current generations of automatic transmissions, which are mostly actuated completely remotely by actuators.

In the case of gearshift transmissions actuated "by-wire", however, the lack of a mechanical connection between the transmission actuating system and the selector lever can cause the selector lever position, under certain boundary conditions or in the event of a fault, no longer to correspond to the actual shift condition of the transmission.

For example, modern automatic transmissions generally comprise a so-termed Auto-P function, which ensures that when the vehicle is left, if necessary the parking lock is automatically engaged in the transmission, so as perhaps to prevent the unattended vehicle from rolling away if the driver has forgotten to engage the parking lock before leaving the vehicle. In other words the Auto-P function, which comes into action automatically in particular when the ignition key is withdrawn or when the vehicle is left, ensures that the parking lock is engaged automatically in the transmission regardless of the drive position actually selected with the selector lever. Thus, the parking lock is engaged by the Auto-P function of the transmission or the vehicle when the selector lever has been left by the driver, for example in the neutral position, in a manual-shift gate if there is one, or in one of the gear positions.

In such a case, however, the position of the selector lever no longer corresponds with the actual shift condition of the transmission. Accordingly, when the driver returns to the vehicle or attempts to start it, by virtue of the selector lever's position the driver to begin with receives incorrect information both visually and by touch. On the basis of his perception of the selector lever position the driver would thus assume, for example, that the transmission is in its neutral position or in a particular gear, whereas in reality the parking lock is engaged in the transmission. This discrepancy between the selector lever position and the condition of the transmission could therefore lead to undesired erroneous operations, wrong conclusions by the driver, and thus also to safety-critical situations. To prevent this a specific, additional signal device for the driver must be provided, which alerts him to the fact that the parking lock has been engaged by Auto-P and that the vehicle can only be started when the selector lever has first been put manually in the parking lock position and thus brought into correspondence with the actual shift status of the transmission.

It has been sought to overcome the above problem by designing the selector levers of shift-by-wire gearshift transmissions as mono-stable actuating elements. In other words, this means that such a mono-stable selector lever, after each actuation, always returns again to the same central position. With a mono-stable selector lever, the feedback on the actual shift status of the transmission therefore relies exclusively on a separate display, for example by means of light-emitting-diodes. On the other hand, with a mono-stable selector lever there is no possibility of providing the driver with visual or tactile feedback about the shift status of the transmission. Moreover, implementation of the mechanical shift logic and the necessary locks—such as the so-termed Keylock and Shiftlock lock systems—in the case of mono-stable selector levers is usually difficult and demands elaborate actuator means for the selective blocking of inadmissible shift commands as a function of the driving status of the motor vehicle, which entails complex design and correspondingly high costs.

For example, the safety function known as the Keylock system, in the case of automatic transmissions, results in a blocking of the selector lever in the "P" position so long as the ignition key is withdrawn.

With actuating devices having a mechanical link to the gearshift transmission, this accordingly prevents unintentional actuation of the selector lever when the ignition key has been withdrawn or when the ignition is switched off, which could result in unintentional disengagement of the parking lock, allowing the vehicle to start moving when this is not desired.

Another example of such a safety function that can only be implemented in the case of mono-stable selector levers with comparatively great effort is the Shiftlock lock system, which serves to ensure that for safety reasons, it is only possible to shift out of the positions "P" and "N" when the brakes are applied. This also serves the purpose of preventing uncontrolled starting-off of the vehicle already at the moment when a gear is engaged.

The known, mono-stable actuating devices also have the disadvantage that the driver has to become accustomed to a new operating concept since the lever always tends to return to its central position, this operating concept being considerably different from the traditional transmission actuation mode.

SUMMARY OF THE INVENTION

Against this background, therefore, the purpose of the present invention is to provide an actuating device for a gearshift transmission, with which the disadvantages associated with the prior art can be overcome. The invention should make it possible, in gearshift transmissions controlled by shift-by-wire as well, for the selector lever position always to reflect the actual shift status of the transmission, so that reliable visual and tactile feedback about the actual shift status of the transmission is provided. In particular it must not be possible, if the parking lock has been automatically engaged ("Auto-P"), for the selector lever to remain misleadingly in one of the gear engagement positions while, in contrast, the parking lock is in fact engaged.

A further objective of the invention is to design an actuating device for a gearshift transmission, and specifically the mounting of the selector lever, which allows the lever to be moved between at least two shift gates, in a simple, particularly compact, inexpensive and robust manner.

First, in a manner known per se, the actuating device according to the present invention comprises a selector lever and a detent device with a spring-loaded detent element that slides in a detent guide-plate. Thus—in conformity with the traditional operating concept—the selector lever is formed as a multi-stable operating element with stable selector lever positions.

According to the invention, however, the actuating device is characterized by a separating device having a thrust wedge driven by an actuator—for example an electric motor, or electro-magnetically. By means of the thrust wedge the detent element and detent guide-plate can be moved by actuation from a first relative position to another relative position. In the first relative position the detent element engages with and is held in corresponding detaining recesses of the detent guide-plate, which represents the normal operation of the actuating device with corresponding retention of the selector lever in the individual selector lever positions. In the other relative position, however, the detent element is disengaged from the detaining track of the detent guide-plate.

In other words, this means that the detaining engagement of the detent element in the detent guide-plate, which takes places during normal operation, can reliably and in a simply designed manner be prevented thanks to the separating device with its thrust wedge according to the invention. Then the selector lever can easily and with very little noise be moved, in particular returned automatically to the parking lock position. This can be done for example by an actuator or by the force of a spring, since the reaction and friction forces of the detent element in the detent guide-plate, which hold back the selector lever, are eliminated thanks to the separating device according to the invention.

Thus, if for example the driver has forgotten to engage the parking lock manually when the vehicle has stopped, the parking lock is engaged automatically by the transmission control system when the ignition key has been withdrawn or the vehicle has been left. Furthermore, by virtue of the separating device according to the invention and, for example, a return spring or an actuator, the selector lever is automatically returned from the last-engaged gear position to the parking lock position, so that the actual shift status of the transmission (parking lock on) in fact corresponds again to the position of the selector lever ("P"). In this way the driver receives correct visual and tactile feedback about the status of the transmission even when the parking lock has been engaged automatically in the gearshift transmission by an automatic Auto-P function.

According to a preferred embodiment of the invention, the actuating device also comprises a drive device connected with the thrust wedge for moving the selector lever by actuator means from a first shift gate to another shift gate. During this, the drive device can be brought into contact against an abutment area connected to the selector lever.

In this way a highly advantageous dual function of the actuator-driven thrust wedge is achieved, in that on the one hand the wedge is used for deactivating the detent device, while on the other hand it is also responsible for the actuator-driven movement of the selector lever, for example out of the manual-shift gate into the automatic gearshift gate. Thus, this allows the selector lever to be moved out of any selector lever position, in particular also the manual-shift gate, and be returned to the parking lock position.

To implement the invention, the type and design of the detent element are not of prime importance. For example, the detent element can consist of a spring-loaded roller. According to a preferred embodiment of the invention, however, the detent element is in the form of a spring-loaded detent bolt. In this case, at its end facing away from the detent guide-plate the detent bolt is preferably connected to a lifting pin, the lifting pin for example passing through it, and the thrust wedge engages under the lifting pin.

In this way force is transferred reliably and in a simply designed manner from the thrust wedge to the detent element formed as a detent bolt. To ensure symmetrical force transfer to the lifting pin and to avoid tilting of the detent bolt, the thrust wedge is preferably made in the form of a fork and can therefore engage under the lifting pin symmetrically at its two ends.

In a further, particularly preferred embodiment of the invention, the actuating device comprises a control guide-plate that can be moved by actuator means and a pivoting lever that engages with the control guide-plate and is driven by the latter, the pivoting lever in turn being in actuating engagement with the thrust wedge.

This gives an advantageously designed and space-saving arrangement of the drive for the thrust wedge. In particular, as also in another embodiment of the invention, the control guide-plate can be arranged so as to move linearly in the longitudinal direction of the vehicle, whereas the pivoting lever, the drive device and the thrust wedge are arranged so that their movement and, as necessary, the actuator-driver displacement movement of the selector lever between shift gates, takes place in the direction transverse to the vehicle. In addition, the control guide-plate can advantageously also be designed for other functions in the actuating device, as will be explained later.

Preferably, the actuating device has an actuator-driven linear spindle for moving and so actuating the control guide-plate, this linear spindle preferably being driven by a servo-motor.

To implement the invention it is not of primary importance how the selector lever is actuated, in particular how it is returned automatically to the parking lock position. It can be proposed, for example, that once the detent device has been deactivated by the separating device, the selector lever automatically moves back to the parking lock position under the action of the spring force of a spring, or else that an actuator of its own is used for this.

However, in a particularly preferred embodiment of the invention an abutment device acting between the control guide-plate and the selector lever is provided, for the actuator-driven pivoting movement of the selector lever. The abutment device serves for the actuated pivoting of the selector lever, especially within the gearshift gate for the actuated return of the selector lever to the parking lock position, so that a very advantageously designed multiple use of the control guide-plate is obtained. This is because in that way the control guide-plate serves both to drive the pivoting lever and thus also the thrust wedge and the separating device, and in addition to drive the actuated swiveling movement of the selector lever.

The invention also concerns an actuating device for the selection of gears in a gearshift transmission, in particular an automatic transmission with shift-by-wire actuation, such that the actuating device comprises a selector lever with several selector lever positions and at least two shift gates.

The actuating device is characterized in that the selector lever—for selecting the gears—can pivot about a bearing spindle in the driving direction and can also be moved along the bearing spindle transversely to the driving direction. This provides a particularly simply designed, robust, but also inexpensive mounting for the selector lever, both as regards the gear positions along the longitudinal direction of the vehicle and as regards the shift gate positions transversely to the driving direction.

In other words, this means that the selector lever can be moved one way or the other along the bearing spindle transversely to the driving direction, in particular between a manual-shift gate and an automated gearshift gate, whereas the actual selection of gears or the manual gearshift in the manual-shift gate takes place by pivoting the selector lever about the bearing spindle. This actuating device is particularly well suited for combination with the above-described separating device and the actuator means associated therewith.

Against this background a particularly preferred embodiment of the invention also provides that with an actuating device having a selector lever that can be moved along the bearing spindle and with the detent device and the separating device, the thrust wedge and the drive device are formed integrally and mounted on the bearing spindle. This embodiment is characterized in that it is particularly inexpensive to produce and in that the arrangement of the thrust wedge and the drive device is of simple and space-saving design.

BRIEF DESCRIPTION OF THE DRAWINGS

Below, the invention is described in more detail with reference to drawings which illustrate embodiments presented only as examples. The drawings show.

DETAILED DESCRIPTION OF THE PREFERRED EMBODIMENTS

Figure 1:
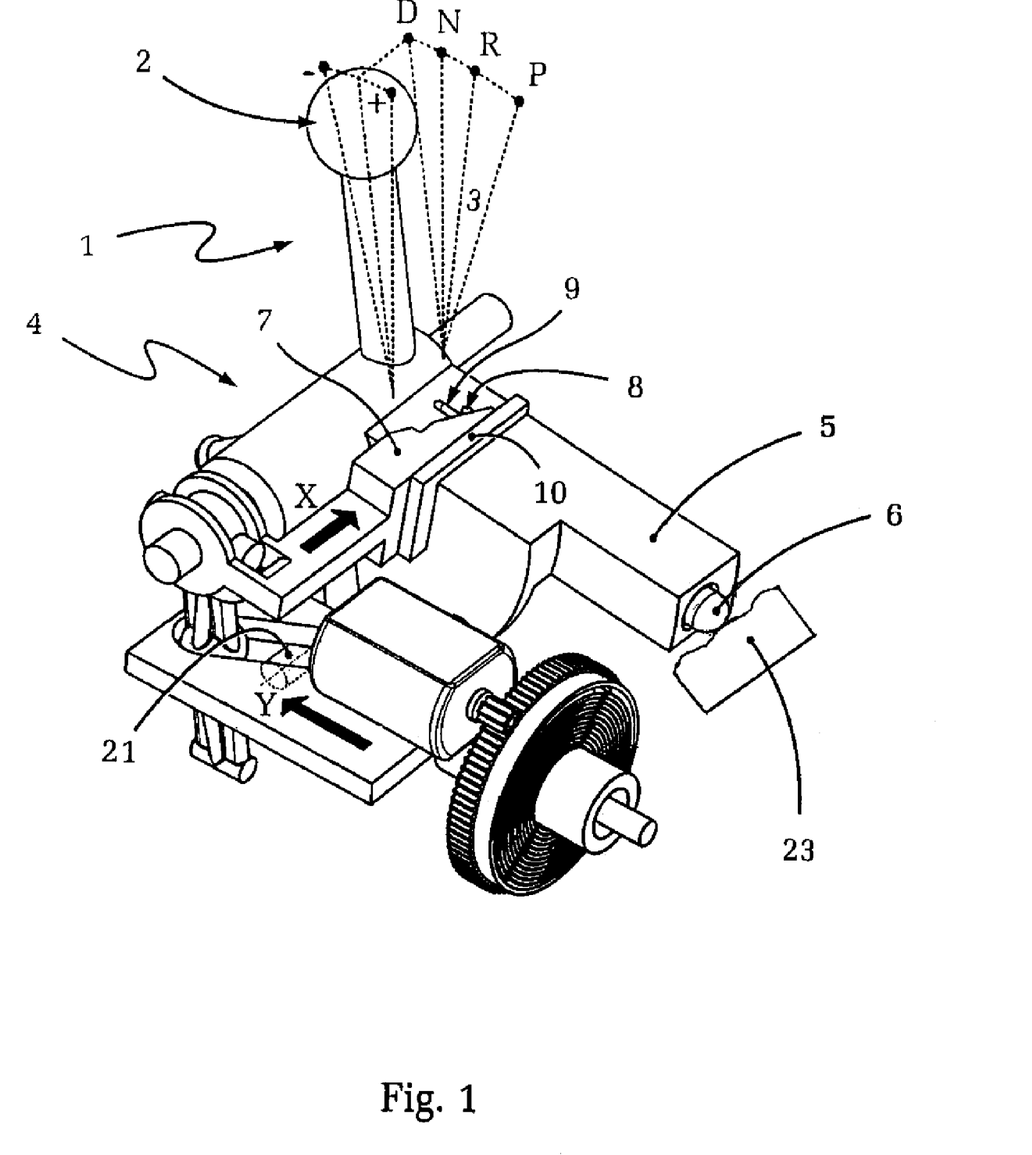
FIG. 1: Schematic, isometric view of an embodiment of an actuating device according to the invention, with the selector lever in the manual-shift gate position

FIG. 1 shows a schematic, isometric representation of an embodiment of an actuating device according to the invention for a gearshift transmission.

First, a selector lever 1 can be seen, with a schematically indicated actuating knob 2. The possible selector lever positions in this example embodiment are indicated by broken lines 3. The positions that the selector lever 1 can adopt in this case are the central position in the manual-shift gate, in which the selector lever 1 is momentarily located in FIG. 1 and, still in the manual-shift gate, manual-shift positions "+" and "−" for manual gearshifts, and in the shift-status gate the shift positions P, R, N and D for selecting the appropriate operating mode of the associated automatic transmission.

Connected integrally with the selector lever 1 is the selector lever mounting 4 and a housing 5, in which is arranged a spring-loaded detent bolt 6. The detent bolt 6 is part of the detent device of the actuating device shown, which also comprises a detent guide-plate 23 with detaining recesses (only schematically shown, for the sake of greater clarity). The detaining recesses are assigned to the stable selector lever positions P, R, N and D and to the central position in the manual-shift gate, in such manner that after selecting one of those positions the selector lever 1 in each case remains in the selected position.

FIG. 1 also shows the separating device with which the detent bolt 6 is drawn back and can thus be brought out of engagement with the detent guide-plate, in order to enable the subsequent automatic return of the selector lever 1 to the parking lock position "P". In particular, the separating device comprises the in this case fork-shaped thrust wedge 7 and a lifting pin 8, which is connected to the detent bolt 6 at the end of the latter facing away from the detent guide-plate and which is held and able to move in a slot 9 in the detent bolt housing 5.

When the thrust wedge 7 is moved in the direction indicated by the arrow X, the inclined plane of the thrust wedge 7 raises the lifting pin 8 within the slot 9, whereby the detent bolt 6 connected to the lifting pin 8 is drawn back in the detent bolt housing 5 and thus brought out of engagement with the detent guide-plate (not shown). During this raising of the lifting pin 8 the thrust wedge 7 rests on a supporting flange 10 arranged on the detent bolt housing.

Figure 2:
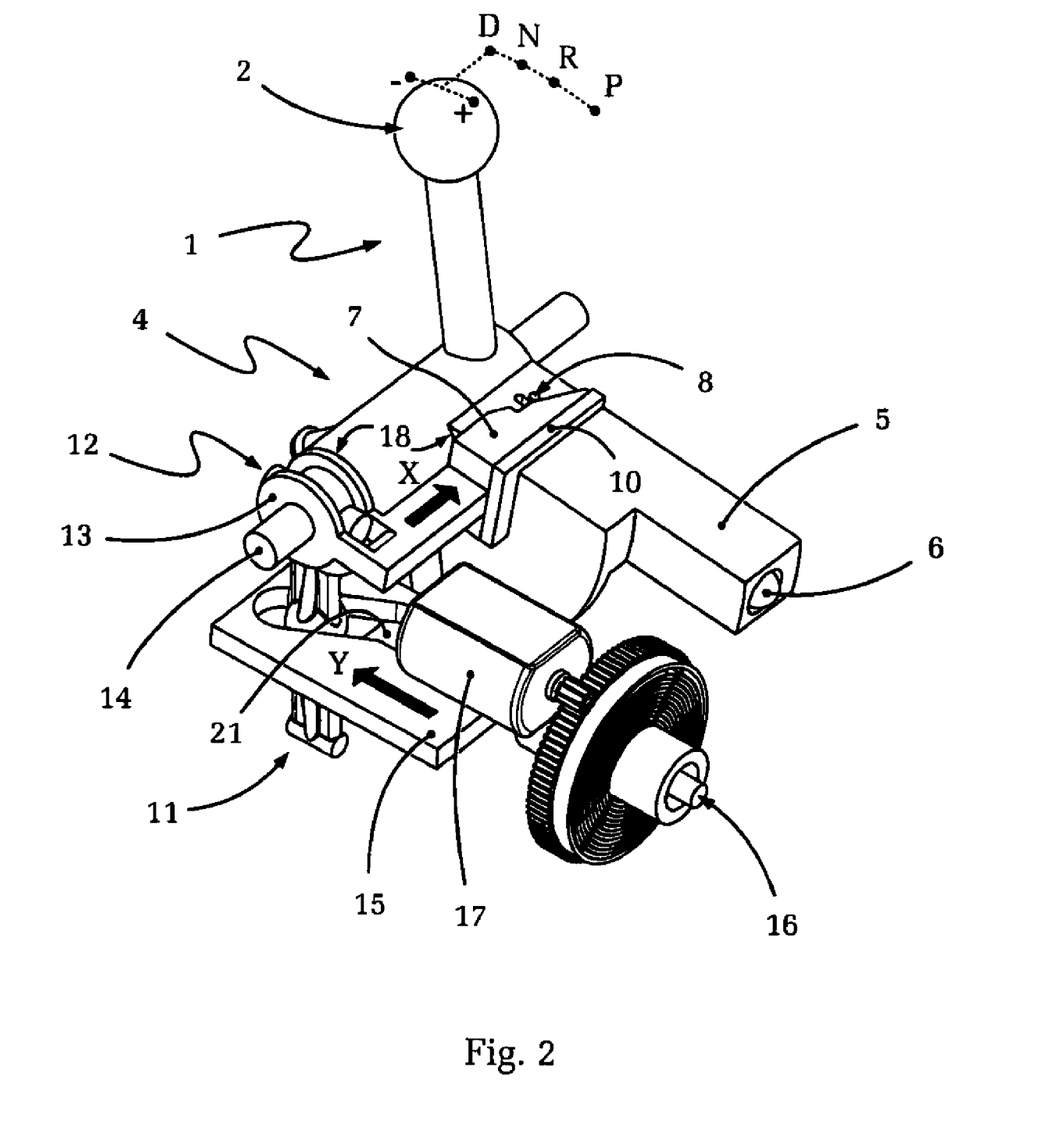
FIG. 2: Representation and view corresponding to FIG. 1, showing the actuating device of FIG. 1 with the thrust wedge activated.

The resulting situation—after the movement of the thrust wedge 7—is shown in FIG. 2. It can be seen that the thrust wedge 7 has moved in the direction of the detent bolt housing 5 and thereby the detent bolt 6 has been drawn back into the detent bolt housing 5 by virtue of the lifting movement of the lifting pin 8.

During this the thrust wedge 7 is moved by a pivoting lever 11, which at its lower end in relation to the drawing is mounted to pivot about a pivot axis connected to the housing base (not shown) of the actuating device, and which has a shift fork 12 at its upper end in relation to the drawing. The shift fork 12 of the pivoting lever 11 engages in a carrier groove of a carrier element 13 connected to the thrust wedge 7, and the carrier element 13 is pushed onto the bearing spindle 14 of the selector lever 1 so that, besides the supporting flange 10, it at the same time forms an additional mounting for the thrust wedge 7, which is joined integrally to the carrier element 13.

In turn, the pivoting movement of the pivoting lever 11 is caused by a control guide-plate 15, in that the control guide-plate 15 is moved along the direction indicated by the arrow Y by a linear spindle 16 driven by a servomotor 17. In other words the detent device of the selector lever 1 is deactivated by virtue of the active chain "servomotor 13, linear spindle 16, control guide-plate 15, pivoting lever 11, carrier element 13, thrust wedge 7, lifting pin 8, detent bolt 6".

Following the withdrawal of the detent bolt 6 into the detent bolt housing 5, as shown in FIG. 2, the control guide-plate 15 is pushed by the servomotor 17 farther along the arrow direction Y. Thereby, the pivoting lever 11 is first pivoted farther in the direction of the arrow X, so that the carrier element 13 and the thrust wedge 7 too are also pushed farther—again in the direction of the arrow X. However, the carrier element 13 and the thrust wedge 7 are already resting against corresponding abutment surfaces 18 on the detent bolt housing 5 or on the selector lever mounting 4 connected integrally to the detent bolt housing. Accordingly, during this farther movement of the carrier element 13 and the thrust wedge 7 along the arrow X direction, there is in addition a corresponding displacement of the selector lever mounting 4 or of the unit comprising the selector lever 1, the selector lever mounting 4 and the detent bolt housing 5, also in the arrow X direction.

Figure 3:
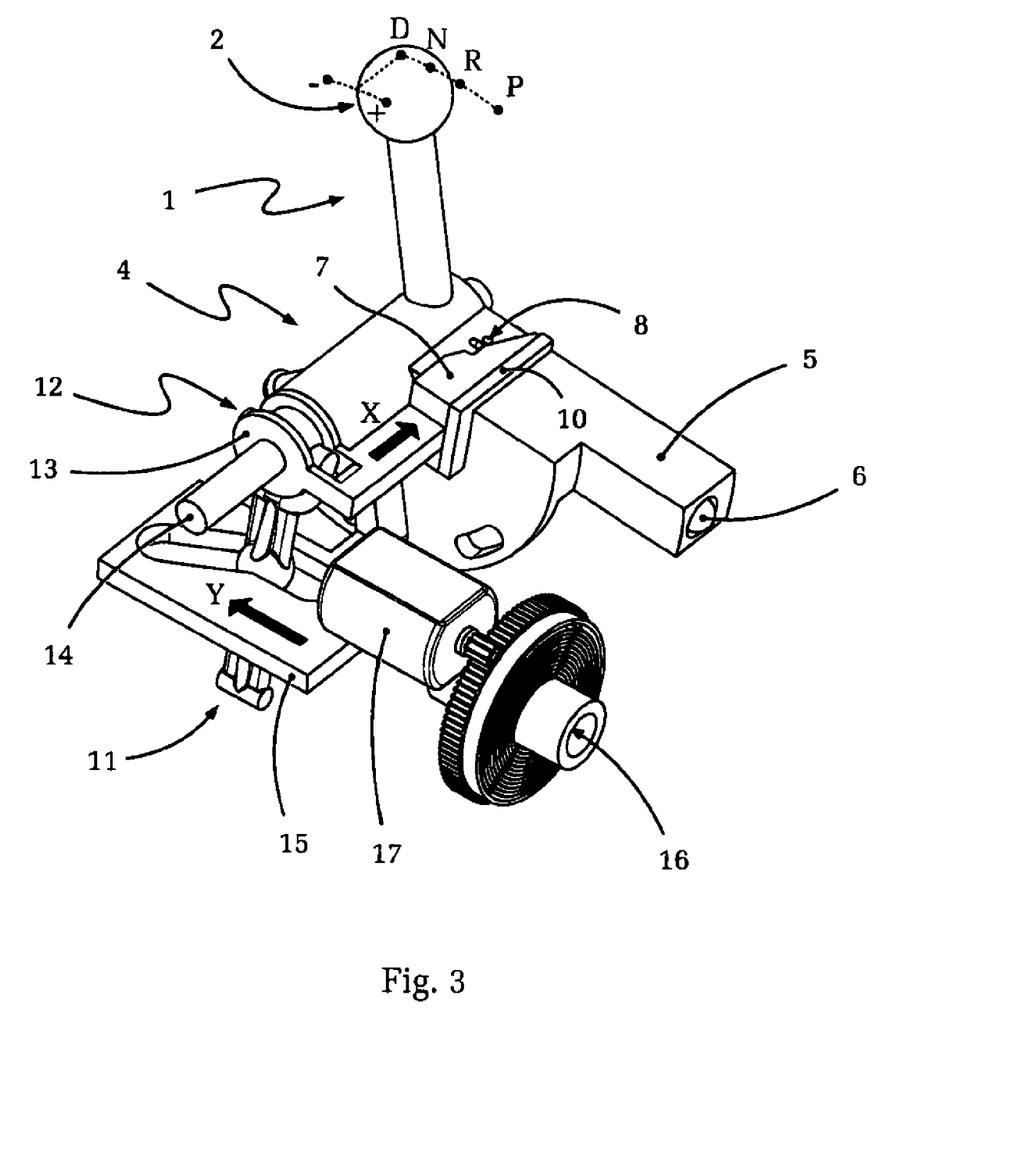
FIG. 3: Representation and view corresponding to FIGS. 1 and 2, showing the actuating device of FIGS. 1 and 2 with its selector lever in the gate for gearshifts

The result of these displacement movements is shown in FIG. 3. It can be seen that compared with the situation in FIG. 2, the control guide-plate 15 has been moved farther in the direction of the arrow Y, so that the pivoting lever 11, carrier element 13, thrust wedge 7 and also the unit comprising the selector lever 1, its mounting 4 and the detent bolt housing 5 has been pushed along the arrow X direction.

During this the movement of the unit comprising the selector lever 1, its mounting 4 and the detent bolt housing 5 takes place by sliding over the bearing spindle 14 of the selector lever 1. In the area of the selector lever knob 2 it can be seen that the selector lever 1 has thereby been moved away from the central position of the manual-shift gate into the shift-status gate, and has now adopted the position that corresponds to driving mode "D".

From this position the selector lever 1 can now be returned to the parking lock position "P". For this, by means of the servomotor 17 and via the linear spindle 16 the control guide-plate 15 is moved a bit more in the arrow Y direction, producing the situation shown in FIG. 4. This linear displacement of the control guide-plate 15 from the position in FIG. 3 to the position in FIG. 4 causes no further sideways movement of the pivoting lever 11 because of the bend 19 in the cut-out in the control guide-plate 15, and thus also of the selector lever 1. However, the control guide-plate 15 has a carrier projection 20 on its underside, which cannot be seen in FIGS. 1 to 4 (but see FIG. 5). In the relative position of the control guide-plate 15 and the selector lever 1 shown in FIG. 3, the carrier projection 20 engages with a carrier pin 21 arranged on the selector lever bearing 4. The carrier pin 21 is indicated with broken lines in both FIG. 1 and FIG. 5.

Figure 4:
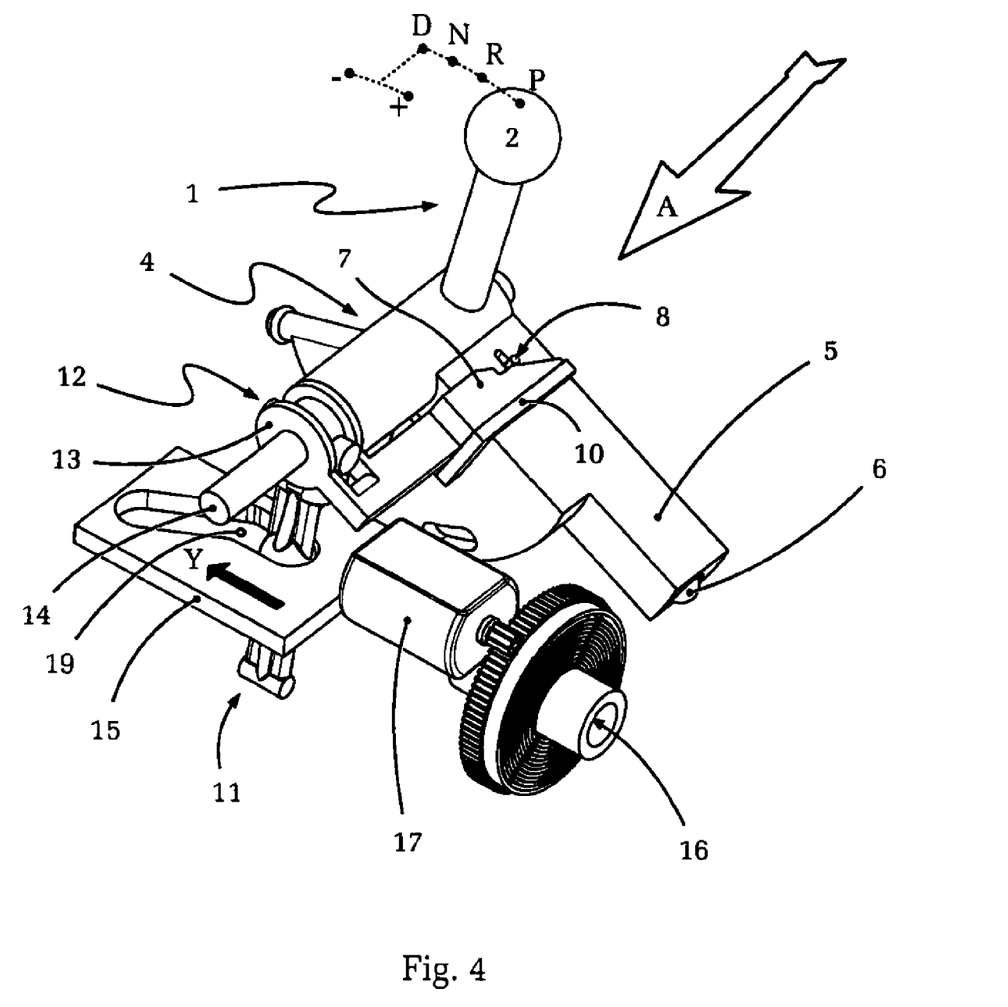
FIG. 4: Representation and view corresponding to FIGS. 1 to 3, showing the actuating device of FIGS. 1 to 3 with the selector lever returned to the parking lock position.
Figure 5:
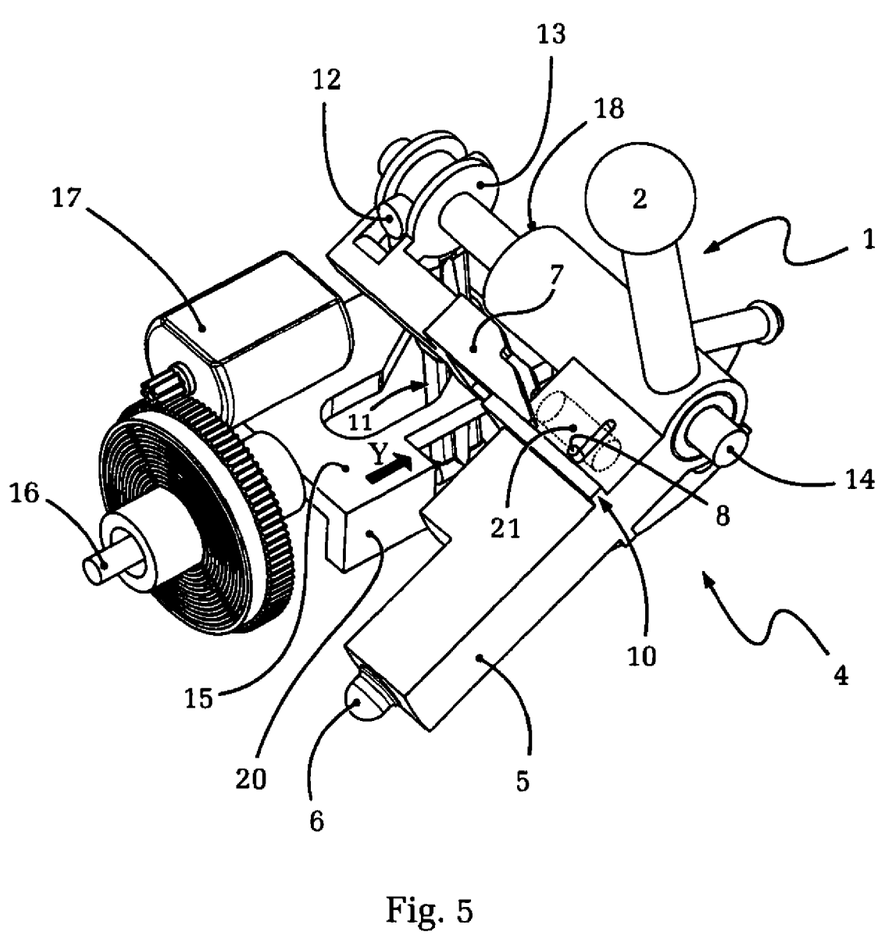
FIG. 5: Another schematic, isometric representation of the actuating device of FIGS. 1 to 4, in the position shown in FIG. 1 but viewed along the direction of the arrow A in FIG. 4.

FIG. 5 corresponds to the situation in FIG. 1, but looking along the arrow P in FIG. 4. In FIG. 5 can be seen, besides the servomotor 17, the linear spindle 16, the control guide-plate 15, the pivoting lever 11, the carrier element 13, the thrust wedge 7, the bearing spindle 14, the selector lever 1 and the detent bolt 6 with its lifting pin 8, in particular the carrier projection 20 on the underside of the control guide-plate 15 and, shown by broken lines, the carrier pin 21 arranged on the selector lever bearing 4. The carrier projection 20 of the control guide-plate 15, in the relative position of the control guide-plate 15 and selector lever bearing 4 shown in FIG. 3, first encounters the carrier pin 21 on the selector lever mounting 4. Then, as the control guide-plate 15 moves farther in the arrow Y direction, the pin 21 is carried along and therefore the selector lever mounting 4 connected to the pin 21, or the unit comprising the selector lever 1, its mounting 4, the detent bolt housing 5 with the detent bolt 6 and the thrust wedge 7 are pivoted counter-clockwise as in FIG. 5, until finally the situation and relative positions shown in FIG. 4 are reached.

From FIG. 4 it can be seen that as a result of the displacement of the pin 21 by the control guide-plate 15, the selector lever 1 is pivoted from position "D" is FIG. 3 to the parking lock position "P" in FIG. 4.

In other words, this means that by virtue of a single linear displacement of the control guide-plate 15, starting from the position of the control guide-plate 15 shown in FIG. 1 and FIG. 5 up to its position shown in FIG. 4, all the processes required for the selector lever 1 to be returned from the manual-shift gate to the parking lock position take place one after another. As described explicitly above these processes consist, in detail, in the deactivation of the detaining means or withdrawal of the detent bolt 6 into the detent bolt housing 5 (see FIG. 2), the linear displacement of the selector lever 1 from the manual-shift gate to the driving position gate (see FIG. 2), the linear displacement of the selector lever 1 from the manual-shift gate to the driving position gate (see FIG. 3), and the subsequent pivoting movement of the selector lever 1 from driving mode position "D" to the parking lock position "P" (see FIG. 4).

The return of the selector lever 1 to the parking lock position works not only from the manual-shift gate, but also from any of the other selector lever positions D, N or R, analogously to what is shown in FIGS. 1 to 4, with the single difference that in each case the selector lever 1 is initially in one of the other positions D, N or R.

As a result it is clear that the invention provides an actuating device for motor vehicle transmissions which, compared with the prior art, has the advantage that the position of the selector lever always reflects the actual shift status of the transmission. Moreover, the mounting of the selector lever and the actuator system for its return are of a particularly compact and robust design, which can be produced inexpensively. Furthermore, thanks to the invention it can be ensured that from any position the selector lever can be reliably returned to the parking lock position. In this way the invention provides the driver with reliable visual and tactile feedback about the actual shift status of the transmission, in particular when the parking lock has been automatically engaged by the "Auto-P" function.

Accordingly, thanks to its inexpensive production and high reliability the invention makes a substantial contribution toward improving the ergonomics and safety of actuating devices for motor vehicle transmissions, especially when used in the context of automatic transmissions with shift-by-wire control.

LIST OF INDEXES

1 Selector lever
2 Actuating knob
3 Selector lever positions
4 Selector lever mounting
5 Detent bolt housing
6 Detent bolt
7 Thrust wedge
8 Lifting pin
9 Slot
10 Supporting flange
11 Pivoting lever
12 Shift fork
13 Carrier element
14 Bearing spindle
15 Central guide-plate
16 Linear spindle
17 Servomotor
18 Abutment surfaces
19 Bend in the guide-plate slot
20 Carrier projection
21 Carrier pin

The invention claimed is:

1. An actuating device for selecting shift positions of a shift-by-wire gearshift transmission, the actuating device comprising:
a selector lever (1) being movable between at least one drive mode position and a parking lock position with stable selector lever positions and a detent device with a spring-loaded detent element (6) and a detent guide plate, and a separating device with an actuator-operated thrust wedge (7), and
the detent element (6) being movable, via the thrust wedge (7), with respect to the detent guide-plate from a first relative position, in which the detent element (6) is engaged in a shift track of the guide-plate, to another second relative position in which the detent element (6) is disengaged from the shift track of the detent guide-plate,
wherein the thrust wedge (7) is bifurcated.

2. The actuating device according to claim 1, wherein a carrier element (13) is connected to the thrust wedge (7) for actuated movement of the selector lever (1) from a first shift gate to a second shift gate, such that the carrier element (13) is brought into contact with an abutment area (18) connected to the selector lever (1).

3. The actuating device according to claim 1, wherein the detent element is a spring-loaded detent bolt (6).

4. An actuating device for selecting shift positions of a shift-by-wire gearshift transmission, the actuating device comprising:
a selector lever (1) being movable between at least one drive mode position and a parking lock position with stable selector lever positions and a detent device with a spring-loaded detent element (6) and a detent guide plate, and a separating device with an actuator-operated thrust wedge (7), and
the detent element (6) being movable, via the thrust wedge (7), with respect to the detent guide-plate from a first relative position, in which the detent element (6) is engaged in a shift track of the guide-plate, to another second relative position in which the detent element (6) is disengaged from the shift track of the detent guide-plate,
wherein an end of the detent bolt (6), facing away from the detent guide-plate, is connected to a lifting pin (8), and the thrust wedge (7) engages with the lifting pin (8).

5. An actuating device for selecting shift positions of a shift-by-wire gearshift transmission, the actuating device comprising:
a selector lever (1) being movable between at least one drive mode position and a parking lock position with stable selector lever positions and a detent device with a spring-loaded detent element (6) and a detent guide plate, and a separating device with an actuator-operated thrust wedge (7), and
the detent element (6) being movable, via the thrust wedge (7), with respect to the detent guide-plate from a first relative position, in which the detent element (6) is engaged in a shift track of the guide-plate, to another second relative position in which the detent element (6) is disengaged from the shift track of the detent guide-plate,
wherein a control guide-plate (15) is displacable by an actuating means and a pivoting lever (11), which is in driving engagement with the control guide-plate (15), for actuating the thrust wedge (7).

6. The actuating device according to claim 5, wherein the control guide-plate (15) is movable linearly in a longitudinal direction of the vehicle.

7. The actuating device according to claim 5, wherein an actuator-operated linear spindle (16) moves the control guide-plate.

8. The actuating device according to claim 7, wherein the linear spindle (16) is driven by a servomotor (17).

9. The actuating device according to claim 5, wherein an abutment device (20, 21) acts between the control guide-plate (15) and the selector lever (1) for the actuated pivoting displacement of the selector lever (1) by the control guide-plate (15).

10. An actuating device for selecting shift positions of a shift-by-wire gearshift transmission, the actuating device comprising:
a selector lever (1) with several selector lever positions and at least two shift gates,
the selector lever (1) being pivotable, in a driving direction, about a bearing spindle (14) and being movable transversely to the driving direction along the bearing spindle (14), and
a detent device with a spring-loaded detent element (6) and a detent guide plate, and a separating device with an actuator-operated thrust wedge (7), the detent element (6) and the detent guide-plate being movable, via the thrust wedge (7), from a first relative position in which the detent element (6) is engaged in a shift track of the guide-plate, to a second relative position in which the detent element (6) is disengaged from the shift track of the detent guide-plate, and
the thrust wedge (7) and a carrier element (13) being integral and mounted on the bearing spindle (14).

* * * * *